(12) United States Patent
Filtvedt et al.

(10) Patent No.: US 9,440,210 B2
(45) Date of Patent: Sep. 13, 2016

(54) GAS DISTRIBUTION ARRANGEMENT FOR A FLUIDIZED BED

(75) Inventors: Werner Filtvedt, Tomter (NO); Arve Holt, Leirsund (NO)

(73) Assignee: Institutt for Energiteknikk (NO)

( * ) Notice: Subject to any disclaimer, the term of this patent is extended or adjusted under 35 U.S.C. 154(b) by 42 days.

(21) Appl. No.: 14/116,939

(22) PCT Filed: May 11, 2012

(86) PCT No.: PCT/EP2012/058775
§ 371 (c)(1),
(2), (4) Date: Jan. 17, 2014

(87) PCT Pub. No.: WO2012/152920
PCT Pub. Date: Nov. 15, 2012

(65) Prior Publication Data
US 2014/0127116 A1    May 8, 2014

Related U.S. Application Data

(60) Provisional application No. 61/484,818, filed on May 11, 2011.

(30) Foreign Application Priority Data

May 11, 2011  (SE) ........................ 1150423

(51) Int. Cl.
*C01B 33/02* (2006.01)
*B01J 8/18* (2006.01)
(Continued)

(52) U.S. Cl.
CPC ............. *B01J 8/1872* (2013.01); *B01J 8/1827* (2013.01); *B01J 8/44* (2013.01); *B05B 1/005* (2013.01);
(Continued)

(58) Field of Classification Search
CPC ....... C01B 33/029; B01J 8/44; B01J 8/1872; B05B 1/005
USPC .................. 423/349, 143, 147; 239/132, 548
See application file for complete search history.

(56) References Cited

U.S. PATENT DOCUMENTS

| 3,295,221 A | 1/1967 | Joy |
| 3,889,631 A | 6/1975 | Lackey, Jr. et al. |
| 2010/0264362 A1 | 10/2010 | Chee et al. |

FOREIGN PATENT DOCUMENTS

WO    WO 03/035548 A2    5/2003

OTHER PUBLICATIONS

Hugo et al., Method for producing high-purity silicon, May 1, 2003, English machine translation of WO 2003035548.*
International Search Report of PCT/EP2012/058775 mailed Jun. 26, 2012, 4 pages.
(Continued)

*Primary Examiner* — Matthew E Hoban
*Assistant Examiner* — James Fiorito
(74) *Attorney, Agent, or Firm* — Myers Bigel & Sibley, P.A.

(57) ABSTRACT

Embodiments provide a gas distribution arrangement, a device for handling a chemical reaction comprising such a gas distribution arrangement and a method of providing a chemical reaction chamber with a gas. The distribution arrangement comprises a distribution plate for separating a chemical reaction chamber from a gas inlet area and having a first side arranged to face the chemical reaction chamber and a second side arranged to face the gas inlet area and comprising a set of through holes stretching between the first and the second side, where the first side of the plate comprises a first material surrounding the holes and having a first thermal conductivity, and the plate also comprises a second material forming a base structure also surrounding the holes and having a second thermal conductivity.

19 Claims, 5 Drawing Sheets

(51) Int. Cl.
  *B01J 8/44* (2006.01)
  *C01B 33/027* (2006.01)
  *C01B 33/107* (2006.01)
  *B05B 1/00* (2006.01)
  *C01B 33/029* (2006.01)
(52) U.S. Cl.
  CPC ........... *C01B 33/027* (2013.01); *C01B 33/107* (2013.01); *B01J 2219/00252* (2013.01); *C01B 33/029* (2013.01)

(56) References Cited

OTHER PUBLICATIONS

Filtvedt et al. "Production of Silicon From SiH$_4$ in a Fluidized Bed, Operation and Results", *International Journal of Chemical Reactor Engineering*, 2013, 11(1): 1-12.

Filtvedt et al. "Composite Distribution Solution for Minimizing Heat Loss in a Pyrolysis Reactor", *International Journal of Chemical Reactor Engineering*, vol. 9, 2011, Article A84, 21 pages.

\* cited by examiner

GAS DISTRIBUTION ARRANGEMENT FOR A FLUIDIZED BED

CROSS REFERENCE TO RELATED APPLICATIONS

The present application is a 35 U.S.C. §371 national phase application of PCT International Application No. PCT/EP2012/058775, filed May 11, 2012, which itself claims priority from Swedish Patent Application No. 1150423-0, filed May 11, 2011 and U.S. Provisional Patent Application No. 61/484,818, filed May 11, 2011, the disclosures of which are hereby incorporated herein by reference in their entirety. PCT International Application No. PCT/EP2012/058775 was published as International Publication No. WO 2012/152920 on Nov. 15, 2012.

TECHNICAL FIELD

The invention relates to reactors for chemical processes such as fluidized bed reactors. More particularly, the invention relates to a gas distribution arrangement, a device for handling a chemical reaction comprising such a gas distribution arrangement and a method of providing a chemical reaction chamber with a gas.

BACKGROUND

In some chemical reactions it is of interest to let a gas enter a chemical reaction chamber via a distribution plate, where the function of the distribution plate is to ensure a uniform supply of the gas to the chemical reaction chamber.

One type of chemical reaction chamber where the use of such a distribution plate is needed is the Fluidized Bed Reactor. Fluidized Bed Reactors are for instance described by W. O. Fildvedt et al in "Development of fluidized bed reactors for silicon production", Solar Energy Materials and Solar Cells, Volume 94, Issue 12, December 2010.

Here a gas is transported to the chamber from a gas inlet area, often denoted Windbox, via a distribution plate.

One known distribution plate is described in U.S. Pat. No. 3,889,631.

In certain chemical reactions encouraged in Fluidized Bed Reactors (FBR), the chamber is held at a high temperature while the gas inlet area has a lower temperature. As the gas enters the high-temperature chamber of the FBR, the gas will decompose and be deposited. This type of chemical process is attractive to use when for instance producing polysilicon from silanes in gas form.

However, it is important in this case that this decomposition does not take place until the gas reaches the chamber, because the gas may start to decompose within the distribution plate and clog it, which will negatively influence the chemical process. This may be solved through cooling the distribution plate. However, if this is done heat may be lost from the chamber through the distribution plate.

There is therefore a need for improvement in relation to distribution plates.

SUMMARY

The invention is therefore directed towards solving at least some of the above mentioned problems associated with distribution plates.

One object of the invention is thus to solve one or more of the above mentioned problems.

This object is according to a first aspect of the invention achieved through a gas distribution arrangement comprising distribution plate for separating a chemical reaction chamber from a gas inlet area and having a first side arranged to face the chemical reaction chamber and a second side arranged to face the gas inlet area, the distribution plate comprising a set of throughholes stretching between the first and the second side, wherein:

the first side of the plate comprises a first material surrounding the holes and having a first thermal conductivity, and the plate also comprises a second material forming a base structure also surrounding the holes and having a second thermal conductivity.

In a preferred embodiment of the present invention the gas distribution arrangement is for the production of silicon and more preferably for the production of polysilicon from silanes and/or chlorosilanes in gas form.

Preferably, the gas distribution arrangement is for a fluidizing bed reactor in a chemical reaction chamber.

It should be appreciated that embodiments and aspects of the invention are suitable or adaptable for other types of chemical reaction chambers and/or fluidizing bed reactors.

This object is according to a second aspect of the invention achieved through a device for handling a chemical reaction comprising:

a chemical reaction chamber,
a gas inlet area, and
a distribution plate for separating the chemical reaction chamber from the gas inlet area, where the distribution plate is a distribution plate as defined in the first aspect of the invention.

This object is according to a third aspect of the invention achieved through a method of providing a chemical reaction chamber with a gas comprising the steps of:

providing the gas G at a first temperature T1 in a gas inlet area,
heating the reaction chamber to a second temperature T2,
preventing heat of the reaction chamber from reaching the gas inlet area using a first side of a distribution plate, which first side is made of a first material having a first thermal conductivity, and
transporting the gas from the gas inlet area through holes in the distribution plate to the reaction chamber, while cooling the holes using a base structure of the distribution plate, which base structure is of a second material having a second thermal conductivity and also surrounds the holes.

The invention according to these aspects has a number of advantages. The invention avoids clogging of the distribution plate. It also improves the ability of the chemical reaction chamber to retain a desired temperature, which reduces the energy consumption of the chemical reaction chamber. Another advantage of the invention is that the net heat transport through the distribution plate is reduced. A further advantage is that a high temperature gradient is sustained over the distribution plate thereby enabling more advantageous process parameters.

The dependent claims are concerned with advantageous variations of the invention.

It should be appreciated that one or more of the invention embodiments and aspects may also comprise one, or a combination of, the elements described herein with reference to the drawings.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices and methods are omitted so as not to obscure the description of the invention with unnecessary detail.

The invention is generally directed towards improvements of distribution plates used in chemical reaction chambers such as in Fluidized Bed Reactors.

Figure 1:
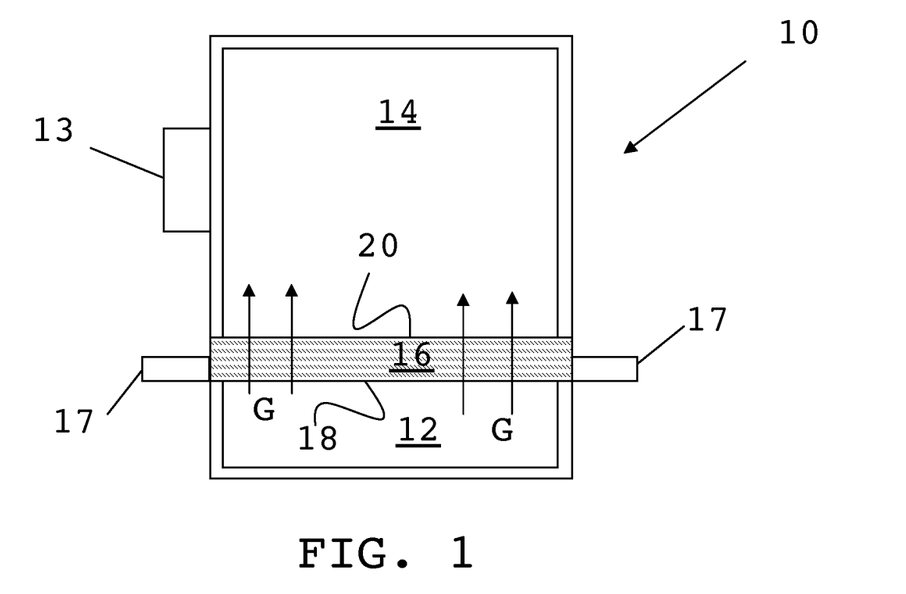
FIG. 1 schematically shows a device for handling a chemical reaction comprising a reaction chamber being separated from a gas inlet area by a distribution plate.

A device for handling a chemical reaction is schematically shown in FIG. 1. This exemplifying device 10 is here a Fluidized Bed Reactor. However, it should be realized that the invention is not limited to this type of reactor, but may be used also with other types of reactors for other types of chemical processes. The invention may more particularly be used in any type of pyrolysis reactor or other temperature dependent reactor where reduction of heat loss is essential.

In the device 10 there is a reactor chamber 14, which is separated from a gas inlet area 12 through a distribution plate 16. A heater 13 is attached to the chamber 14 in order to provide heat to it. The distribution plate 16 is here a part of the wall of the chamber and in this example furthermore the bottom of the chamber 14. It should however be realised that it may as an example also be a part of the side wall of the chamber. The plate has furthermore a first side 20, which faces the chamber 14 and a second side 18 that faces the gas inlet area 12. In this first embodiment there is also one distribution plate. It should be realized that it is possible to use more than one such plate. The plate is here furthermore shown as being planar. It should be realized that it is not limited to being planar but may have any suitable shape. It may for instance be curved or bent. The shape of the distribution plate may furthermore be adapted to the intended shape of the reactor chamber 14.

The plate is perforated, which means that a gas G can come from the gas inlet area 12 and enter the chamber 14 via the distribution plate 16, where the distribution plate 16 here has the function to distribute the gas evenly in the chamber 14. The plate 16 is furthermore thermally connected to a heat diverting element, here in the form of a heat sink 17. In one variation of the invention the heat sink and distribution plate together make up a gas distribution arrangement of the invention. In other variations only the distribution plate makes up such a gas distribution arrangement. The heat sink may here be further cooled by a cooling media, typically a cooling fluid, which may be circulated in a loop. A cooling fluid may be a liquid like water or a gas such as air.

Figure 2:
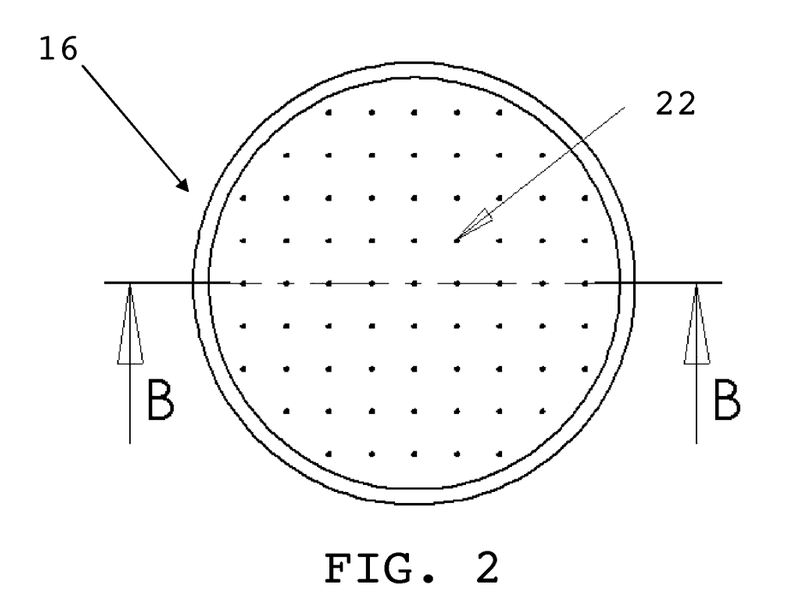
FIG. 2 shows a view from above of the distribution plate.

FIG. 2 shows a view from above of the distribution plate 16. It is thus a view displaying the first side of the plate. The plate has a set of holes 22, which are provided in a pattern. These holes go through plate from the first to the second side, i.e. they are throughholes. In the disclosed variations of the invention they are placed on the plate in a gas distribution pattern or a distribution scheme designed for providing a good gas distribution in the chamber. We have here illustrated a square pattern. Other types of gas distribution patterns are however possible. Here it should also be known that the distance between the holes should be higher than the hole diameter and this distance should typically be at least five times higher and with advantage at least ten times higher than the hole diameter in order to provide good flow conditions in the chamber. This would naturally depend on the type and layout of the reactor. As an alternative the holes may be randomly distributed.

Figure 3:
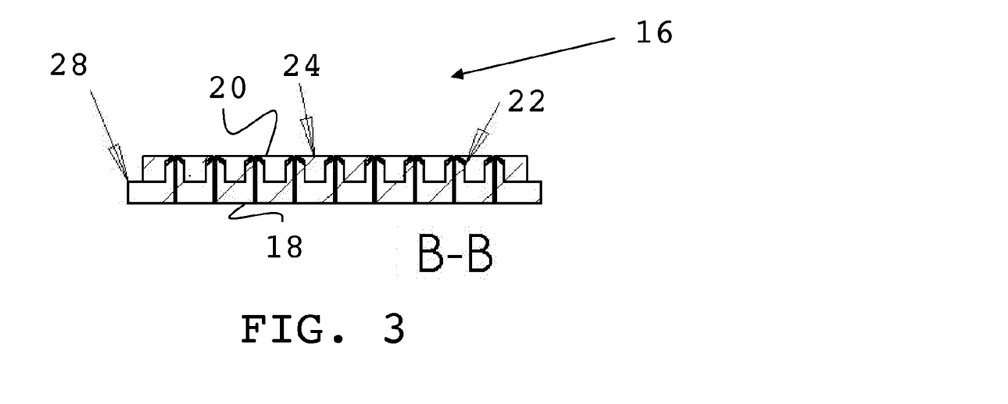
FIG. 3 shows a cross-sectional view of the distribution plate in FIG. 3 according to a first embodiment, FIG. 4 schematically shows a first variation of the walls of a hole in a distribution plate according to a second embodiment, FIG. 5 schematically shows a second variation of the walls of a hole in a distribution plate according to a third embodiment, FIG. 6 schematically shows a third variation of the walls of a hole in a distribution plate according to a fourth embodiment.

In some embodiments of the invention the distance between the holes is about seventeen times higher than the diameter. The hole density may also be higher than 500 holes/m$^2$, with advantage higher than 1000 holes/m$^2$, advantageously higher than 3000 holes/m$^2$ and in some embodiments about 3500 holes/m$^2$. In the figure a line B-B through the centre of the plate is also shown FIG. 3 shows a cross sectional view of the plate according to a first embodiment of the invention taken along line B-B in FIG. 2.

As can be seen the first side 20 is comprised or is made of a first material 24, which material surrounds the holes and has a first thermal conductivity. The first material may surround the holes in a direction that is perpendicular to the length direction of the holes. Here also the holes 22 are shown. The first material 24 is a substantially non-compressible fibrous material which is machinable, such as packed ceramic fibre insulation. These holes 22 have walls that are at least partly made up of a third material, which material has a third thermal conductivity. In the figure also the second side 18 of the plate 16 is shown. The second side comprises or is made of a second material 28 surrounding the holes and having a second thermal conductivity. Also the second material may surround the holes in a direction that is perpendicular to the length direction of the holes. In this first embodiment of the invention the distribution plate 16 is formed through a base plate or base section on which insulation is placed, where the insulation is made of the first material 24 and the base plate or base structure of the second material 28. Furthermore in this first embodiment the second and third materials are the same material and therefore the second and third thermal conductivities are the same. The walls of the holes are therefore, in this first embodiment wholly provided through the base plate. This means that the walls of the holes are obtained through protrusions that stretch out from the base plate through the insulation towards the first side 20. The second and third materials here have a higher thermal conductivity than the first material and for instance more than 100 times higher. The material of the walls and base plate are in this example a metal, which in the first embodiment is aluminium. It should however be realized that other materials may be used, such as for instance steel, copper or even graphite. It is an advantage if the material chosen has properties which make it resistant to any reaction with the gas coming into contact with the material. For example, when chlorosilanes are used, corrosion-resisting alloys such as Inconel® may be preferred to aluminum.

Each hole thus has at least one wall. In case the holes have a circular or elliptical cross-section each hole will only have one wall. However, if the walls have square or rectangular cross-section, then they will have four walls and if they have triangular cross-section they will have three walls.

The parts of the holes that stretch through the insulation 24 are here formed as tubes having an inner surface with an inner diameter and an outer surface with an outer diameter. Furthermore a first section of this tube at a first end of the tube facing the first side 20 has an outer surface with an increasing outer diameter from a first to a second outer diameter in the direction from the first side 20 towards the base plate 28. The outer diameter thus increases from a first outer diameter that is essentially equal to the inner diameter of the tube to a second larger diameter. In this embodiment the tube wall made up of the inner and outer surfaces has a linearly increasing wall thickness in the first section, which makes the holes have a conical shape facing the chamber, i.e. in the opposite direction.

This means that at the first side 20 the holes are surrounded by insulation 24 right up till the inner diameter. It should here be realized that as an alternative it is possible that the tubes have the same outer diameter all the way to the base plate 28.

The base plate may be cooled, for instance using the previously mentioned heat sink.

A chemical reaction in the reactor for which the distribution plate can be employed may require a high temperature difference between the chamber and the gas inlet area during transport to the chamber. In for instance silicon production, where silanes like monosilane or trichlorosilane are used as gas, the temperature in the chamber may need to be above 700° C., for instance around 710° C. or 800° C., while the temperature in the gas inlet area typically is below 420° C. and with advantage slightly lower, such as a temperature in the range of 250° C. to 400° C. and more preferably 300° C. to 350° C. The reason for this is that at 420° C. silane starts to decompose, while good crystal structures are obtained at 710° C. This means that the latter temperature is present at the first side 20 of the distribution plate 16, while the former is present at the second side 18.

This also means that if nothing is done, the throughholes will exhibit a gradual increase in temperature from the second 18 to the first side 20. However, this also means that parts of the holes will have the temperature at which the gas decomposes. The result is that material, and in this example silicon, will be deposited on the walls of the holes. This will lead to the holes becoming clogged, which will result in the chemical process becoming less and less effective. This also means that it may be necessary to replace distribution plates frequently.

This problem of clogging is thus serious and needs to be addressed. At the same time it is important that the heat of the chamber is not lost via the distribution plate, which leads to an unnecessarily high energy consumption.

These and other problems are according to the invention addressed through keeping the temperature of the holes as close to the temperature of the gas inlet area as possible. This is combined with keeping the temperature at the first side of the plate, the side facing the chamber, at the chamber temperature.

This is according to the invention solved through the first side of the distribution plate comprising a first material surrounding the holes and having a first thermal conductivity for retaining the chamber temperature combined with using the second material of the base plate having a second thermal conductivity cool the holes of the distribution plate.

The thermal conductivity of the second material is with advantage higher than the thermal conductivity of the first material.

The thermal conductivity of the second material is with advantage at least 100 times higher, with advantage 1000 times higher and according to the first embodiment about 3000 times higher than the thermal conductivity of the first material. Here the first material, i.e. the insulation, may have a thermal conductivity of 0.08 W/m-K while aluminium may have a thermal conductivity of 237 W/m-K.

The heat that is transferred to the holes will be led away from the walls to the base plate and into the optional heat sink, which will prevent clogging.

Through the use of insulating material, the temperature of the chamber will be held high also adjacent to the first side of the distribution plate, which ensures a good chemical reaction. As small amounts of heat from the chamber is transferred to the holes, it is also clear that the energy losses are small, even in the case that a heat sink is connected to the distribution plate, which furthermore leads to an economical operation of the device with optimal heat and energy savings. In this way the energy consumption of the chemical reaction chamber is reduced. Another advantage of the invention is that the net heat transport through the distribution plate is reduced. Yet another advantage is that a high temperature gradient is sustained over the distribution plate thereby enabling more advantageous process parameters. The construction of the distribution plate is also robust.

Here the conical shape of the holes has the further advantage of reducing the amount of heat transferred into the holes from the chamber even further.

It is possible to vary the design of the holes in several ways in order to improve the ability to keep the whole temperature down and lower the heat dissipation from the chamber even further.

Figure 4:
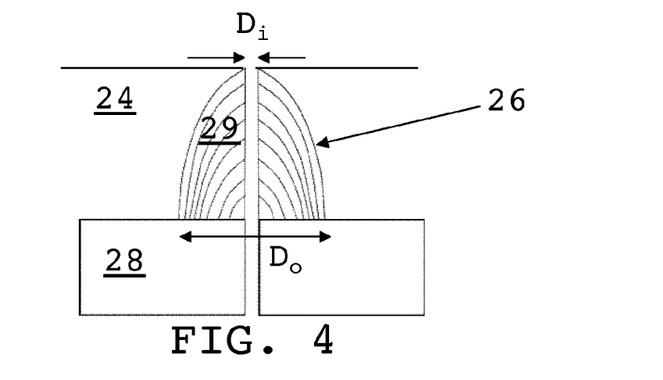

FIG. 4 shows a cross section of a part of plate with a first variation of the hole according to a second embodiment of the invention.

The wall of the hole is here in the bottom made up of the second material 28 of the base plate, which as one example is aluminium. However the part that protrudes through the insulation 24, which in this embodiment is a tube only including the first section 29, is made of another material, which is here anisotropic graphite. Here the whole part of the tube stretching up through the insulation is made of this other material, the third material 26. The outer diameter $D_o$ of the outer surface in this section 29 is here furthermore increasing in the direction from the chamber to the base plate. It is increased from the first outer diameter that is equal to the inner diameter $D_1$ to the second outer diameter. The outer surface having the outer diameter $D_o$ is here curved and the radius of this outer surface may more particularly increase essentially exponentially or logarithmically.

Furthermore in this second embodiment the part of the hole wall that is provided with this third material is anisotropic and has a higher thermal conductivity along the length of the hole than radially away from the hole. This means that the first section 29 is anisotropic. In this second embodiment this higher thermal conductivity furthermore follows the curvature of the outer diameter $D_o$.

This has the advantage of even further reducing the heat transfer from the reaction chamber to the hole while maximizing cooling of the whole throughhole surface thanks to favored heat exchange with the heat sink. Operating parameters will be set such as to keep gas temperature close to the inner wall lower than the decomposition temperature at the outlet of the through-hole.

Figure 5:
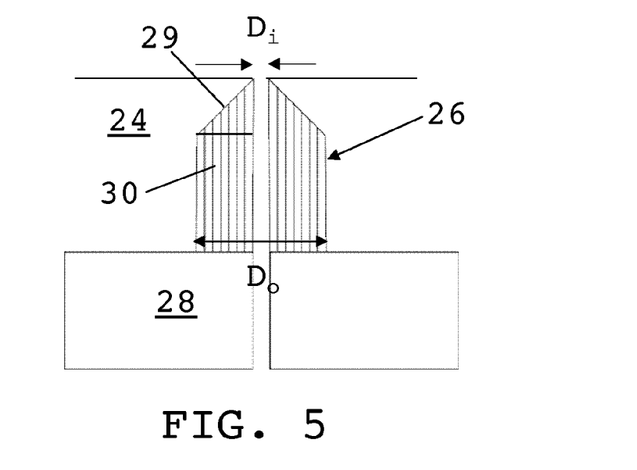

A second variation of the hole according to a third embodiment of the invention is shown in FIG. 5. Here the part of a hole wall extending above the base plate is also anisotropic and has a higher thermal conductivity along the length of the hole than at right angles to the hole, i.e. radially. However in this embodiment the direction of higher thermal conductivity is parallel with the hole, i.e. with the hole axis. The first section 29 with increasing outer diameter is here also shaped as in the first embodiment. The tube of third material in this third embodiment thus has a first section 29 with an increasing outer diameter providing a linearly increasing wall thickness in the direction from the first side towards the base plate 28. There is also a further section 30 of the tube having a constant outer diameter. This further section 30 here rests on the base plate 28. Both the first and the second sections 29 and 30 are here anisotropic with the same direction of thermal conductivity in parallel with the hole length.

Figure 6:
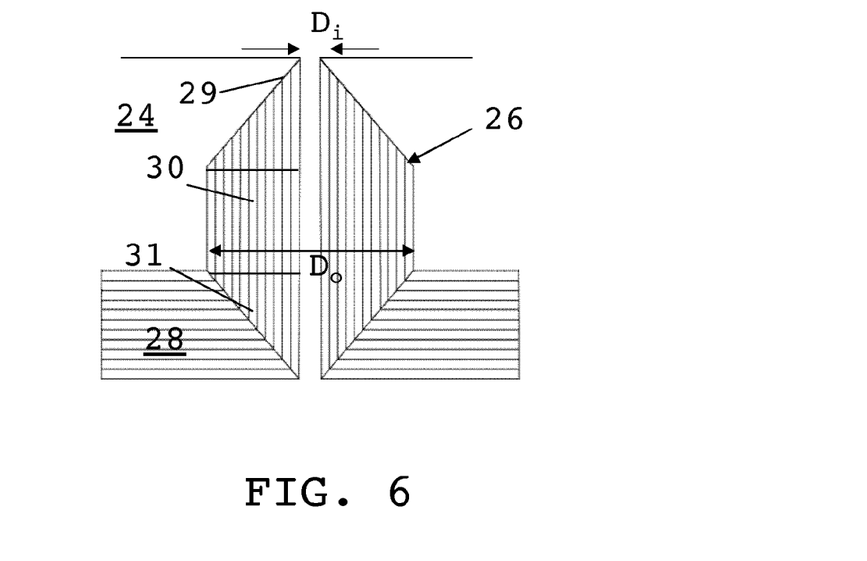

A third hole variation according to a fourth embodiment is shown in FIG. 6. Here the same direction of thermal conductivity and first tube section shape is provided as in the third embodiment. However, in this case the third material stretches down into the base plate in the same way as it stretches into the insulation. There is thus here a second section 31 of the tube of third material with an outer diameter providing a linearly diminishing wall thickness, which second section 31 stretches from the insulation 24 all the way down to the gas inlet area. The second section thus has an outer surface with a diameter that decreases linearly from the second outer diameter to a third outer diameter in the direction towards the second side, which third outer diameter in this case is equal to the first outer diameter. In this fourth embodiment the base plate is furthermore different in that it is also anisotropic and may for instance be made of graphite. The second material 28 may thus be graphite. However, here the base plate has a higher thermal conductivity in the radial direction from the hole than in the length direction along the length of the hole. This improves the ability to keep the hole temperature low even further.

The thermal conductivity along the hole may be at least four times higher than the thermal conductivity radially away from the hole, preferably at least 20 and with advantage at least 100 times higher. As an example it may be approximately 120 times higher.

It should here be realised that the fourth embodiment may be varied in that the first and second sections of the third material may have the same shape and thermal conductivity direction as the first section of the third material in the second embodiment.

Figure 7:
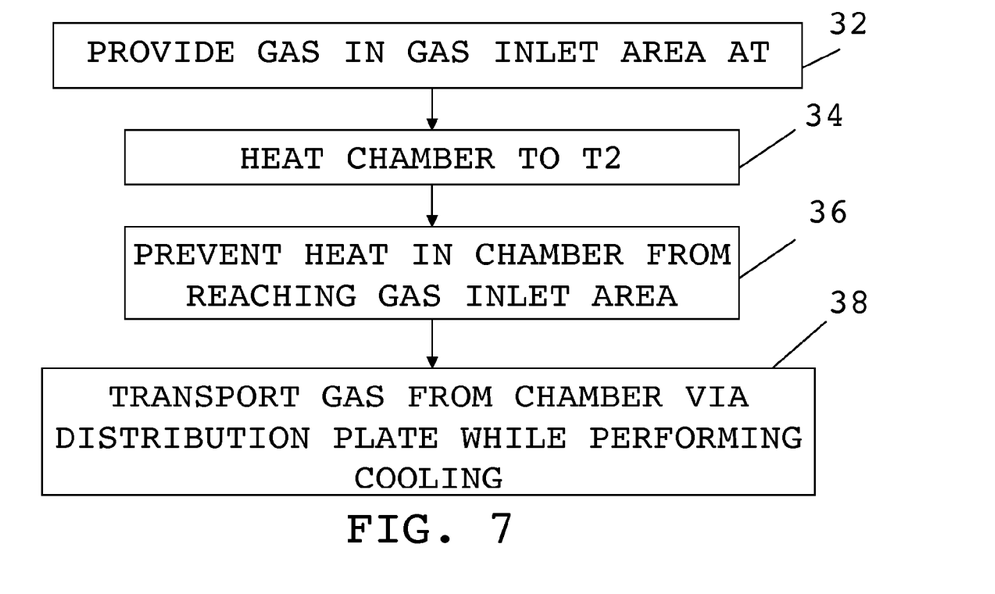
FIG. 7 shows a flow chart of a number of method steps being performed in a method of providing a chemical reaction chamber with a gas, FIG. 8 schematically shows a hole according to another variation of a distribution plate comprising a further material layer.

An example of one way of operating the device will now be described with reference being made to FIG. 7, which shows a flow chart of a method of transporting gas to the chamber 14. The method is a part of a chemical process, which is here the process of producing silicon wafers based on the gas silane.

In the method, the gas is provided at a first temperature T1 in a gas inlet area, step 32, which temperature may be 200° C. The reaction chamber is also heated to a second temperature T2, step 34, which second temperature is here a temperature of 600° C. However, it shall be appreciated by those skilled in the art that operation parameters will depend on the process considered and the gas used. For example, when using Chlorosilanes, temperatures will be generally higher.

In order to keep the heat from dissipating, the heat of the reaction chamber is furthermore stopped from reaching the gas inlet area using the first side of the distribution plate, step 36, i.e. using the first material having the first thermal conductivity. This first side may here have a third temperature T3. The gas is also transported from the gas inlet area through the holes in the distribution plate to the reaction chamber, step 38, and this transporting is made while cooling the holes using the base structure of the distribution plate. This cooling of the walls will lead to the gas being transported through the holes also being cooled.

Through this way of operating, the heat in the chamber is to a high degree retained in the chamber, here at the temperature where silane decomposes and the heat of the chamber is stopped from escaping through the distribution plate by the use of the insulation, which is beneficial for the energy consumption of the device. At the same time cooling of the hole walls ensures that clogging is avoided.

In a further embodiment of the above method there is an additional method step whereby the gas is heated in the inlet area 12 and/or is heated prior to entering the inlet area 22.

The gas in the holes would normally receive heat from the upper part of the distribution plate, i.e. from the part of the plate that is closest to the reaction chamber. This heat is removed by the cooling provided through the invention. The gas will also receive heat directly from the reaction chamber. This heat transfer can be influenced by the speed which the gas is passed through the distribution plate. The heating can thus also be regulated through the velocity of the gas.

The example of a chemical process that was given above was the production of silicon. The invention is naturally not limited to this field but may be used for other types of processes, such as for instance oil and gas production processes.

A hole wall or base structure being described as anisotropic may be obtained in different ways. It is for instance possible that the material used as a wall or base structure is as such thermally anisotropic. However it is also possible to obtain anisotropy through assembly of different isotropic layers of material, where the interfaces between the layers cause the anisotropy.

There are thus several ways in which the anisotropic walls can be obtained. It is for instance possible to provide the walls based on using highly anisotropic flexible materials, shaping them according to the desired function and binding them together with a high temperature binder. This is for instance described at http://www.techapps.com/thermalstraps.html. As an example it is possible to bake highly conductive graphite strings in a sintered material such as silicon nitride, silicon carbide or other suitable material. As an alternative it is possible to produce a synthetic custom carbon design directly (premature technology), which is described at http://www.asbury.com/images/pdf/SyntheticGraphitePartI.pdf. This may be done by a number of methods. The whole or parts of a hole wall may be produced from a synthetic graphite material produced from high temperature treatment of carbon particles of different properties.

Figure 8:
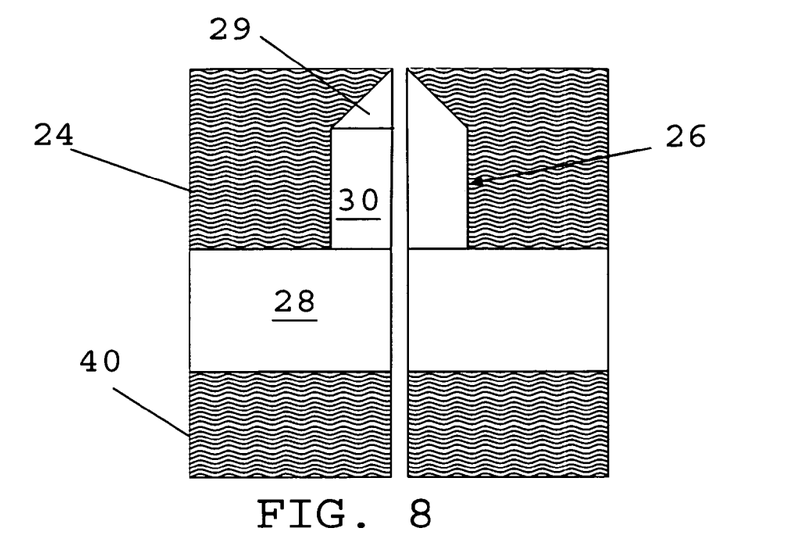

There is yet a further way in which the invention may be provided, which is shown in FIG. 8, which essentially shows the same insulation 24, base plate 28 and tube 26 as FIG. 5. However, in this embodiment of the invention the distribution plate comprises a further material 40. This further material 40 is furthermore provided at the second side of the distribution plate. The second side here thus comprises the further material. Here the second material 28 has a higher thermal conductivity than the further material 40 and in one specific variation of the invention the further material is the same as the first material. This further material may therefore also be insulation. It can in this way be seen that a distribution plate can also be provided in the form of a cooling base structure sandwiched between two layers of insulation, which base structure may then cool the holes, with advantage through being connected to a heat sink.

A number of tests have been performed on the distribution plate described in the first embodiment.

In one experiment a cooling media was passed through the heat sink. In this example, the inlet temperature of the cooling media was 10° C. while the outlet temperature was 44° C. This setup resulted in a temperature of 278° C. at the first side of the plate in the chamber while the temperature at the second side of the plate was about 35° C. A considerable temperature difference was thus observed. A further test of the plate was done with water at boiling temperature. The water inlet was reduced to a bare minimum such that the whole heat sink reservoir reached boiling. At the outlet of the heat sink there was provided a 1.5 m high vertical section which overflowed when the water level got too high. This setup yielded a close to constant temperature around the heat sink and the extracted heat was removed as evaporation energy. By using this setup the second side of the distribution plate would hold a constant temperature T1 of about 78° C. while the temperature T3 at the first side reached 423 C. Further into the chamber an even higher temperature T2 of 650° C. was obtained.

Figure 9:
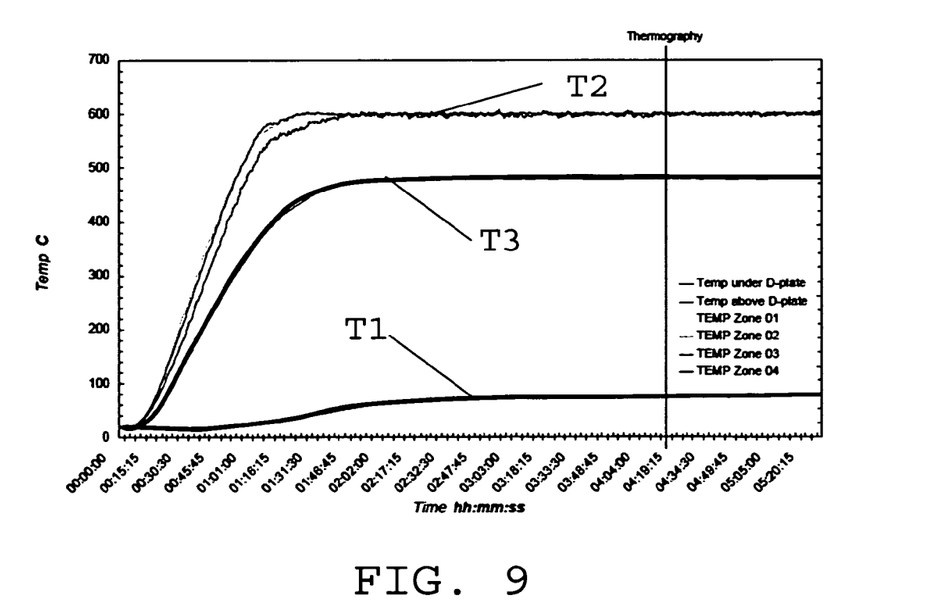
FIG. 9 shows a graph of the temperature inside the chemical reaction chamber and at the first and second sides of the distribution plate, and FIGS. 10 and 11 schematically show a further variation of the device for handling a chemical reaction comprising an additional layer located adjacent the first side of the distribution plate according to a further embodiment.

The results of the last test are shown in a graph in FIG. 9.

Figure 10:
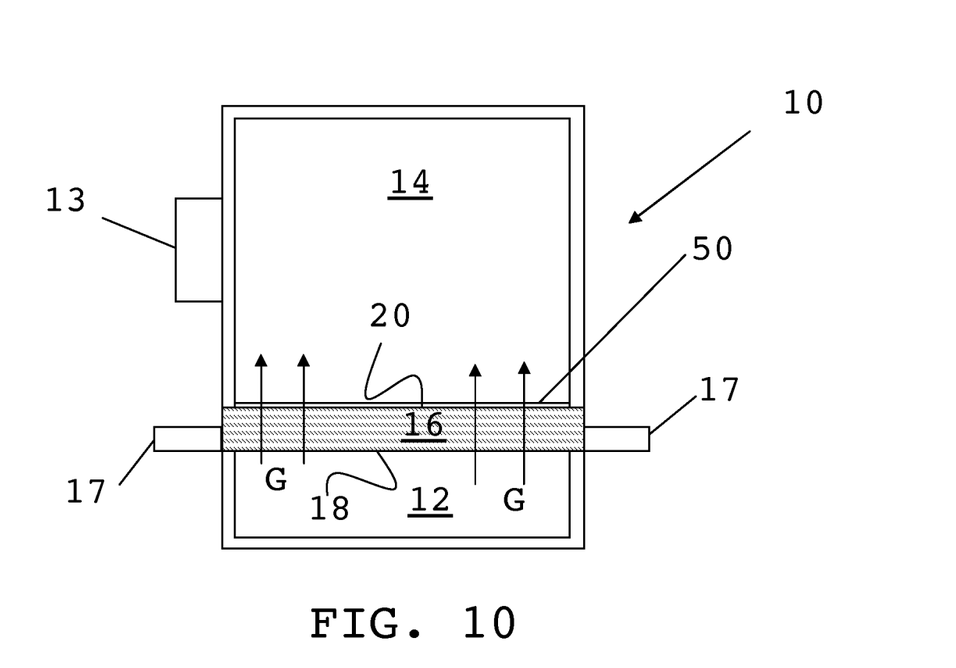
Figure 11:
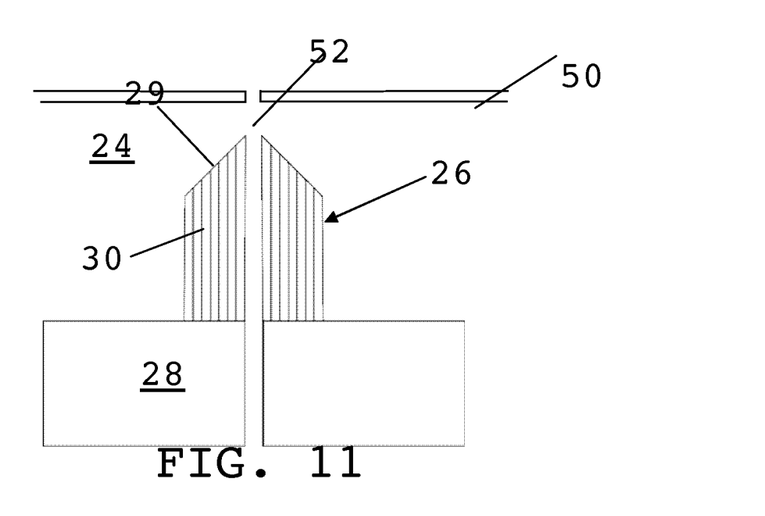

With reference to FIGS. 10 and 11, there is shown a further embodiment of the invention which comprises an additional layer 50. This further embodiment is shown in FIG. 11 in relation to the second variation of the walls shown in FIG. 5 and the same reference numbers have been used to designate corresponding elements. However, it should be appreciated that the additional layer 50 of the further embodiment may also be applied to any one of the device embodiments described herein.

The layer 50 is a substantially planar structure and is located adjacent the first side 20. However, it should be appreciated that the layer 50 may be another shape which substantially matches the shape or contour of the first side 20. The layer 50 has a typical thickness of 2 mm or lower. Preferably the layer 50 is located using mechanical clamping means around the outer circumference of the layer 50 and/or the layer 50 is attached to the first side 20 using a suitable adhesive. In an alternative variation the layer 50 is a silicate, such as a silicon dioxide, silicon carbide, silicon nitride or similar type of material, which is formed onto the first surface by a suitable process.

The layer 50 is formed with a series of holes 52 which align with the throughholes 22 of the distribution plate. The layer 50 is preferably made from a material which will substantially withstand the abrasive action of the fluidizing bed. A preferred material for the layer 50 is silicon, but other suitable materials may be used. The purpose of the layer 50 is to provide a protective layer over the first side 20 in order to protect the first material 24 and help prevent any material contaminants coming from the first material 24 into the reaction chamber 14.

In this further embodiment of the device, the inlet area 12 is provided with means (not shown in FIG. 10) for changing the temperature of the gas in the gas inlet area 12. The means for changing the temperature of the gas is preferably a heating means, which could be any suitable thermal heat source such as an electrical heater or a fluid heat exchanger. The thermal heat source either changes the temperature of the gas in the inlet area 12, or alternatively the heat source changes the temperature of the gas prior to entering the inlet area 12. Preferably the heat source increases the temperature of the gas in the inlet area 12. In this embodiment the temperature of the gas in the inlet area 12 is ideally substantially close to, but less than, the optimum gas reaction temperature, for example the decomposition temperature of the gas. The benefit of having the gas in the inlet area 12 close to the reaction temperature is that the loss of temperature of the gas due to passing through the throughholes 22 will not significantly affect the efficiency of gas chemical reaction of the gas after exiting the throughholes 22 into the reaction chamber 12. If the temperature of the gas remains close to the reaction temperature while travelling from the inlet area 12 to reaction chamber 14 then the gas will react, for example decompose, in a shorter time and/or distance after exiting from the throughholes 22 than the time or distance achievable if the temperature of the gas is significantly less than the reaction temperature on exiting the throughholes 22. It should be appreciated that on the one hand the temperature of the gas should be controlled as described previously in order to help prevent clogging, but on the other hand the efficiency of the chemical reaction in the chamber 14 is improved if the gas exiting the throughholes 22 is as near as possible to the ideal required reaction temperature of the gas. The skilled person will understand that in some arrangements the level of temperature control may be less and will depend on the type of characteristics gas or fluid, such as susceptibility to decomposition, being transported and the particular process parameters.

While the invention has been described in connection with what is presently considered to be most practical and preferred embodiments, it is to be understood that the invention is not to be limited to the disclosed embodiments, but on the contrary, is intended to cover various modifications and equivalent arrangements.

The invention claimed is:

1. A method of controlling a chemical reaction in a fluidized bed reactor chamber for silicon production with a gas, comprising:
  providing the gas at a first temperature in a gas inlet area, wherein the first temperature is between 200° C. to 400° C.;
  heating the reaction chamber to a second temperature, wherein the second temperature is between 600° C. to 800° C.;

inhibiting heat of the reaction chamber from reaching the gas inlet area using a first side of a distribution plate wherein the first side comprises a first material having a first thermal conductivity; and transporting the gas from the gas inlet area through holes stretching between the first side and a second side in the distribution plate to the reaction chamber while cooling the holes using a base structure of the distribution plate, wherein the base structure is of a second material having a second thermal conductivity and also surrounds the holes, wherein the second material has a higher thermal conductivity than the first material, wherein transporting the gas from the gas inlet area through the holes in the distribution plate to the reaction chamber further comprises transporting the gas through holes comprising at least one wall at least partly made of a third material having a third thermal conductivity higher than the first thermal conductivity of the first material, wherein the second material is in thermal contact with the third material, and wherein the second material is different from the third material.

2. The method of claim 1, further comprising altering the gas temperature when the gas is in the inlet area or prior to the gas entering the inlet area.

3. The method of claim 2, further comprising increasing the gas temperature when the gas is in the inlet area or prior to the gas entering the inlet area.

4. The method according to claim 1, wherein the method provides a chemical reaction in a chemical reaction chamber.

5. The method of claim 1, wherein transporting the gas from the gas inlet area through holes in the distribution plate to the reaction chamber further comprises regulating a velocity with which the gas passes through the holes in the distribution plate.

6. The method of claim 1, wherein the gas is passed through holes at least partly defined by tubes made of the third material with an inner surface having an inner diameter and an outer surface having an outer diameter, and wherein the tubes comprise a first section at a first end facing the first side and in which the outer diameter increases from a first outer diameter to a second outer diameter away from the first end.

7. The method of claim 6, wherein the first section is anisotropic with higher thermal conductivity in a direction along a length of a corresponding hole than radially away from the hole.

8. The method of claim 7, wherein the outer surface of the first section is curved and the direction of higher thermal conductivity of the anisotropic first section follows the curvature of the outer surface.

9. The method of claim 7, wherein the outer surface of the first section has a linearly increasing outer diameter and the direction of the higher thermal conductivity of the first section stretches in parallel with the hole.

10. The method of claim 7, wherein the base structure is anisotropic having higher thermal conductivity radially away from the hole than along the length of the hole.

11. The method of claim 1, wherein inhibiting heat of the reaction chamber from reaching the gas inlet area using the first side of the distribution plate further comprises using a layer located adjacent the first side.

12. The method of claim 11, wherein the layer located adjacent the first side is a silicate material.

13. The method of claim 6, wherein inhibiting heat of the reaction chamber from reaching the gas inlet area further comprises using the second side of the distribution plate arranged to face the gas inlet area, and wherein each tube comprises a second section at a second end facing the second side and in which a diameter of the outer surface diminishes from the second outer diameter to a third outer diameter, smaller than the second outer diameter, towards the second end.

14. The method of claim 1, wherein inhibiting heat of the reaction chamber from reaching the gas inlet area further comprises using the second side of the distribution plate arranged to face the gas inlet area, and wherein the second side comprises a fourth material having a fourth thermal conductivity lower than the second thermal conductivity of the second material.

15. The method of claim 14, wherein the fourth material is the same as the first material.

16. The method of claim 6, wherein the third material is anisotropic with higher thermal conductivity in a direction along a length of a corresponding hole than radially away from the hole.

17. The method of claim 6, wherein the tubes further comprise a second section at a second end facing the second side having a third outer diameter which is constant, and wherein the third material is anisotropic in both the first section and the second section with higher thermal conductivity in a direction along a length of a corresponding hole than radially away from the hole.

18. The method of claim 1, wherein the fluidized bed reactor chamber comprises a gaseous environment, wherein the gas is a silicon-containing gas, and further comprising:

causing the silicon-containing gas that emerges from the holes stretching between the first side and the second side in the distribution plate to decompose into solid silicon in the gaseous environment.

19. A method of producing solid silicon from a silicon-containing gas in a reactor chamber of a fluidized bed reactor containing a gaseous environment, comprising:

providing the silicon-containing gas at a first temperature in a gas inlet area;

heating the reaction chamber to a second temperature;

inhibiting heat of the reaction chamber from reaching the gas inlet area using a first side of a distribution plate wherein the first side comprises a first material having a first thermal conductivity;

transporting the silicon-containing gas from the gas inlet area through holes in the distribution plate to the reaction chamber while cooling the holes using a base structure of the distribution plate, wherein the base structure is of a second material having a second thermal conductivity and also surrounds the holes; and causing the silicon-containing gas that emerges from the holes in the distribution plate into the reaction chamber to decompose into solid silicon in the gaseous environment, wherein transporting the gas from the gas inlet area through the holes in the distribution plate to the reaction chamber further comprises transporting the gas through holes comprising at least one wall at least partly made of a third material having a third thermal conductivity higher than the first thermal conductivity of the first material, wherein the second material is in thermal contact with the third material, and wherein the second material is different from the third material.

* * * * *

UNITED STATES PATENT AND TRADEMARK OFFICE
CERTIFICATE OF CORRECTION

PATENT NO. : 9,440,210 B2
APPLICATION NO. : 14/116939
DATED : September 13, 2016
INVENTOR(S) : Filtvedt et al.

Page 1 of 1

It is certified that error appears in the above-identified patent and that said Letters Patent is hereby corrected as shown below:

In the Specification

Column 7, Line 4: Please correct "$D_1$" to read as -- $D_i$ --

Signed and Sealed this
Second Day of May, 2017

Michelle K. Lee
*Director of the United States Patent and Trademark Office*